United States Patent

Robertson

[11] 3,990,430
[45] Nov. 9, 1976

[54] SOLAR ENERGY COLLECTOR SYSTEM
[76] Inventor: Harry S. Robertson, 4722 Alhambra Circle, Coral Gables, Fla. 33146
[22] Filed: Dec. 22, 1975
[21] Appl. No.: 642,910

[52] U.S. Cl. ................................ 126/271; 126/270
[51] Int. Cl.² ............................................ F24J 3/02
[58] Field of Search ............ 126/270, 271; 237/1 A

[56] References Cited
UNITED STATES PATENTS

| | | | |
|---|---|---|---|
| 1,240,890 | 9/1917 | Shuman et al. | 126/271 |
| 2,803,591 | 8/1957 | Coanda et al. | 126/270 |
| 2,907,318 | 10/1959 | Awot | 126/271 |
| 3,866,285 | 2/1975 | Clark | 126/271 |
| 3,915,147 | 10/1975 | Rineer | 126/271 |
| 3,923,039 | 12/1975 | Falbel | 126/270 |

Primary Examiner—Kenneth W. Sprague

[57] ABSTRACT

The solar energy collector system of the present invention comprises a multi-element collector combined with an optical radiation concentrator system, which system is designed to permit optimization of the energy collection process by proper sequential flow of a heat-transfer fluid through the multi-elements of the collector system.

14 Claims, 8 Drawing Figures

SOLAR ENERGY COLLECTOR SYSTEM

BACKGROUND OF THE PRESENT INVENTION

The collector system of the present invention, basically includes a semi-cylindrical or other optical concentrating means which can take any of a wide variety of cross sectional shapes such as parabolas, hyperbolas, catenaries, semi-ellipses, higher order curves or composite surfaces made up of segments of simple curves, including planes. Such shapes can be used in semi-cylindrical reflectors of any required length or to form circular mirrors or mirrors of any desired shape.

The collector elements are made of metal, and coated with a good radiation absorber, preferably black, by any known process, the simplest of which consists of a black coated metal strip in intimate thermal contact with a pipe, tube duct or other channel through which the heat-transfer fluid flows. These range in complexity of manufacture from simple lengths of pipe or tubing, soldered or otherwise fastened to the black metal strips or plates, either flat or curved to conform to the shape of the pipe, thereby improving the thermal contact, to laminate strips with internal fluid channels between the laminae, or extrusions combining the fluid channels and collector plates in one piece.

Various designs exist for improving the collection efficiency and/or concentration of the radiation by proper orientation of the system of the present invention. Instead of continuous orientation, with the requisite sensors, controls and motor-drive mechanism, the necessary performance may be achievable by means of a monthly, for example, change in the collector angle and the proper design and construction of the collector elements.

Therefore, one of the principal objects of the present invention is to provide a solar energy collector device comprising an elongated optical concentrating member, generally semi-cylindrical in cross section and having a reflective inner surface, and a multipartite collector that sequentially heats the heat-transfer fluid carried in pipes, tubes or ducts associated with the multipartite collector in a manner so as to improve the instantaneous and/or average energy collection efficiency of the device relative to a single-element collector.

A further object of this invention is to provide a bank of said solar energy collector devices in assembly.

Yet another object of this invention is to provide a solar energy collector device in which the energy is concentrated, permitting the attainment of somewhat higher temperatures than in a conventional flat-plate collector.

Another object of this invention is to provide a solar energy collector device which results in lower energy losses and provides for insulation more effectively than in a flat-plate collector while permitting higher temperatures.

A still further object of the present invention is to provide a solar energy collector device which operates efficiently with no required adjustment of tilt angle, as in most focusing collectors.

Figure 1:
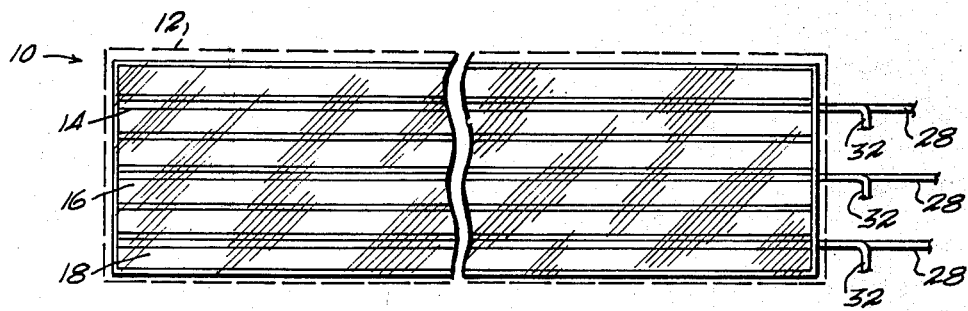
FIG. 1 is a semi-schematic plan view of a bank of solar energy collector devices, in assembly, in accordance with the present invention.

DETAILED DESCRIPTION OF THE DRAWINGS:

With reference to the drawings in which like reference characters designate like or corresponding parts throughout the various views, and with particular reference to FIG. 1, a typical bank of solar energy collector devices is illustrated at 10 in any appropriate type of fixed frame 12, illustrated in broken lines. Three of the devices 14, 16 and 18 are illustrated; however, in practice any required number thereof may be included in said bank 10.

Figure 2:
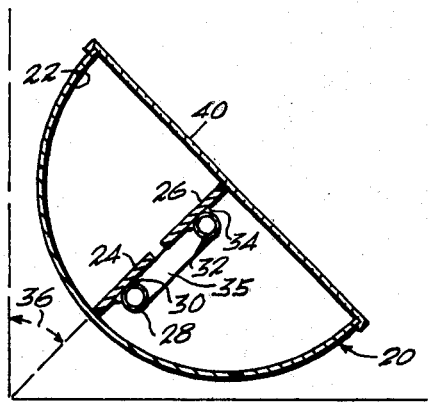
FIG. 2 is a transverse sectional view through a single solar energy collector assembly angled away from vertical, the angle being approximately equal to the latitude.

With reference to FIG. 2, the collector system comprises a semi-cylindrical member 20 having a mirror inner surface 22. A split collector plate means 24 and 26, thermally insulated from each other by an air space therebetween, bisects the area within the semi-cylindrical member 20. The collector plates 24 and 26 are designed to heat a fluid such as water, oil, air, or some fluid used in a refrigeration cycle, more efficiently than can be done with a flat plate collector, and much more simply than is ordinarily possible with a focusing collector. A fluid conduit 28 is fixed in any conventional manner, as by soldering 30, to the lower collector plate 24, and a similar conduit 32 is similarly fixed at 34 to the upper plate 26. Conduits 28 and 32 are interconnected at 35.

The bank 10 of FIG. 1 is longitudinally mounted in an East, West disposition and the angle 36 approximately equals the latitude of the installation. The angle 38 of FIG. 3 designates a typical angle of incidence of light rays. The angle of incidence 38 will change with the time of day. A calculatable fraction of the light incident on the left half of the mirror surface 22 will be collected on surface $a$ of collector plate 24 and the balance of surface $c$, and similarly for the right half of mirror surface 22 on surfaces $b$ and $d$. For clear days at noon, the annular angular excursion of the sun is plus or minus 23.5 degrees, and the system will produce an average concentration of 70 percent of the radiation on the $a$–$b$ surface combination, for East-West alignment of the mirror axis at the elevation angle 36, equal to the latitude. But because of the mirror surface properties, for angles of incidence up to 45 degrees, there is more radiant energy concentrated on plate 24 than on plate 26. Thus, if the heat exchange fluid passes through the system twice, first down pipe 32, FIGS. 1, 2 and 3, and then back through pipe 28, it is heated more effectively than is possible with a flat plate collector, and higher conversion efficiencies are possible. Lenses, Fresnel lenses, and combinations of these with mirrors may also be used to concentrate the radiation.

Figure 3:
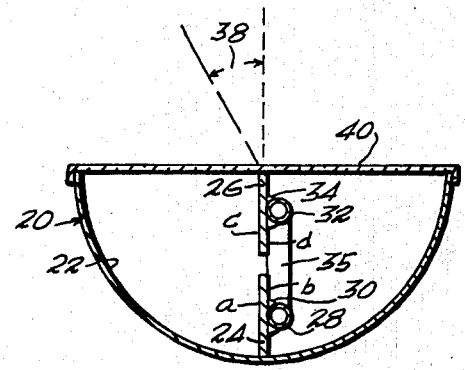
FIG. 3 is a transverse sectional view through a single solar energy device and indicating a typical angle of light incidence.

As illustrated in FIGS. 2 and 3, the open top of the semi-cylindrical member 20 is sealed by a transparent cover 40, of glass or of any appropriate synthetic material.

Figure 4:
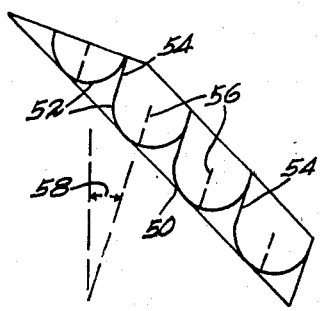
FIG. 4 is a schematic illustration of a collector bank on a roof of non-optimum pitch.

FIG. 4 illustrates the orientation of a bank of solar energy collector devices of the present invention, oriented to a non-optimum roof pitch. Numeral 50 designates the roof pitch, 52 the basic reflector member, 54 a supplementary plane reflector, 56 the split collector plate, and 58 the correct collector angle.

Figure 5:
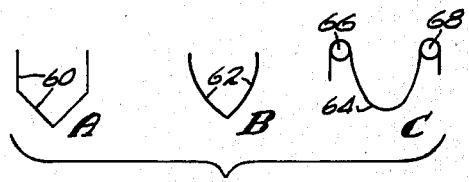
FIGS. 5A, B and C schematically illustrate some of the cross sectional configurations of the reflector members, possible in accordance with the present invention.

FIGS. 5A, B and C are schematic illustrations of just some of the alternative cross sectional configurations of reflector members that may be used in place of the semi-circular members of FIGS. 2 and 3. FIG. 5A illustrates the use of plane mirrors 60, FIG. 5B illustrates segments of simple curves 62, and FIG. 5C illustrates the use of a thin film reflector 64 suspended between two supporting bars 66 and 68.

Calculations shown in Table I are useful in assessing the performance of the system. At an angle of incidence 38, as shown in FIG. 3, a calculable fraction of the light incident on the left half of the mirror aperture will be collected on surface $a$, and the rest on surface $c$. Similarly for the right half, with surface $b$ and $d$. Table I shows the energy distribution for a range of incidence angles, and the last two columns show the distribution averaged over both surfaces of each collector plate.

pose. It comprises a semi-cylindrical mirror reflector 70, a transparent cover 72, a plurality of pairs of collector plates 74 and 76, separated by insulator plates 78, fluid conduits 80 and 82 fixed relative to each pair of collector plates 74 and 76, and tubular convection shield 84 enclosing each pair of plates 74 and 76, their associated insulator plate 78 and fluid tubes 80 and 82.

Figures 7, 8:
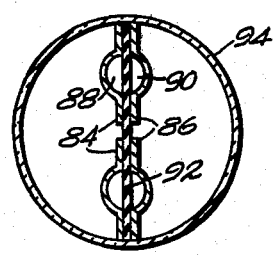
FIG. 7 is an enlarged cross sectional view of a further modification of a collector segment as applied to the form of the invention illustrated in FIG. 6.
FIG. 8 is an enlarged cross sectional view of a modified form of a single collector plate which may be integrally molded or otherwise formed with one or a plurality of conduits.

As illustrated in FIG. 7, laminar collector plates 85 and 86, similar to plates 74 and 76, may be formed to provide channels 88 and 90 for passage of the heat-transfer fluid on the respective sides of the insulator plate 92. As in the above described forms of the invention, the collector plates are coated with black surfaces and the insulator plate 92 therebetween permits the heat absorption of the opposed collector plates 84 and 86 to be used independently. The above described assembly is enclosed in a tubular convection shield 94 which is preferably evacuated and sealed, to eliminate convective heat losses, said tube being formed of clear glass or of an appropriate clear synthetic material. A plurality of the above described assemblies may be substituted for the similarly shielded assemblies of FIG. 6. The transparent cover plate 72 may be omitted. However, a plastic cover formed of a material marketed by DuPont under the trade name of Tedlar, or a similar material, may be utilized just for protection of the mirror surfaces.

Appropriate insulation materials may be utilized wherever needed such as between the collector assembly and the fixed frame to eliminate conduction and

TABLE I

| | Fraction of energy collected by surface | | | | Average for each plate | |
|---|---|---|---|---|---|---|
| | a | c | b | d | (a+b)/2 | (c+d)/2 |
| $0<\theta<7.5°$ | .96 | .04 | .65 | .35 | .805 | .195 |
| $7.5°<\theta<15°$ | .90 | .10 | .54 | .46 | 72 | .28 |
| $15°<\theta<22.5°$ | .82 | .18 | .49 | .51 | .655 | .345 |
| $22.5°<\theta<30°$ | .75 | .25 | .45 | .55 | .60 | .40 |
| $30°<\theta<37.5°$ | .67 | .33 | .40 | .60 | .535 | .465 |
| $37°.5°<\theta<45°$ | .575 | .425 | .34 | .66 | .46 | .54 |

A more effective, but somewhat more troublesome and expensive, way to use the system is to collect on the four surfaces separately, running the fluid sequentially through cdba, with $c$ and $d$, $a$ and $b$ separated by a thin insulator. The final pass along $a$ would usually have an effective concentration of about 85%, or a concentration ratio of $.85/.5 = 1.7$. This is enough to yield satisfactory temperatures for solar air-conditioning systems to operate with acceptable efficiency.

The angle of incidence, 38, in FIG. 3 is as shown for the results in Table I. But for a collector of fixed tilt, the angle 38 at noon normally changes from one side to the other with season, and during the summer, angle 38 changes sides twice each day. Therefore, the hottest surface will sometimes be $a$ and sometimes $b$, and the flow sequence $cdba$ is changed sometimes to $dcab$.

In practice the direction and sequential flow of the heat transfer fluid through successively hotter parts of the conduit means is coordinated with the angle of tilt of the collector system and the angle of incidence of the radiant energy from the sun on the collector so as to permit optimum energy collection.

For large scale industrial utilization of solar energy a focusing collector system is normally required and an expensive, complicated aiming system is normally necessary. However, a large diameter solar collector system, as illustrated in FIG. 6, will accomplish this purconvection heat losses.

Figure 6:
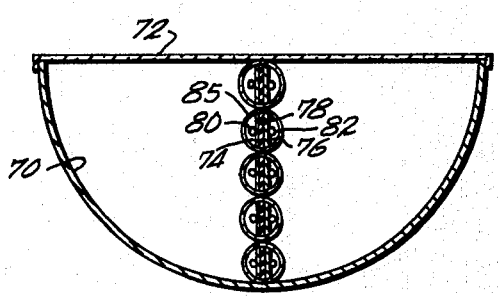
FIG. 6 is a cross sectional view of a modified form of multipartite collector of the present invention.

Laminar collector plates and insulator plates in combination with the fluid conduits of FIGS. 6 and 7 may be substituted for the split plates and fluid conduits of FIGS. 2 and 3.

For small, virtually maintenance-free installations, the collector array and optical system should be sealed in an insulated box with a clear glass cover. The collector array can consist of two or more fluid channels attached to metal collector strips, as shown in FIGS. 2, 3, 6, 7 and 8, with the fluid circulated through the channels in order of increasing energy input. As seen in FIG. 8, a collector plate 96 and one or a plurality of conduits 98 may be integrally extruded or otherwise formed.

Modular kits for do-it-yourself home installations could be marketed with enough design variations available to allow each to have unique and distinctive features. These modules can be connected in series in whatever shape of array is best suited to the user's situation. Such kits could also be made in somewhat more complicated form for use by professional installers.

For most installations, it is most convenient to store the heated fluid in an insulated tank at ground level, rather than at the usual roof-top level of the solar collector system. Therefore it becomes necessary and convenient to use a sensor-controlled fluid pump to circulate the heat-exchange fluid appropriately. Many standard, simple circuits exist for comparing the fluid temperatures in the tank and collector, and causing the pump to act only when it is beneficial for it to do so. Particular advantages of this program are evident for the retrofitting of a solar water heater to an existing hot water system. Here it saves the price of a new hot-water tank, and it permits the use of the existing gas or electric system as backup without extensive modification. The ability of the sensor-controlled pump, combined with the present multipartite collector system to produce and store hotter water than that available from a simple flat-plate collector, permits the continued use of a smaller hot water storage tank than is normally recommended for a solar hot-water system.

What is claimed is:
1. A solar energy collector system comprising:
an elongated heat concentrating means of a predetermined cross sectional configuration, defining an outwardly opening cavity having a mirror inner surface;
a multipartite heat collector means generally bisecting the cross sectional area of said cavity, and extending substantially along the length thereof; and including
a conduit means in thermal contact with and extending along the length of said multipartite collector means said heat collector means includes at least two collector plate means, means mounting said plate means in spaced non-contacting relation in said heat concentration means whereby said plate means are thermally insulated from each other by insulating means, for circulating a heat transfer fluid from a source of supply through said conduit means to an exit means, wherein the direction and sequential flow of said heat transfer fluid through successively hotter parts of said conduit means is coordinated with the angle of tilt of said collector system and the angle of incidence of the radiant energy from the sun on said collector means so as to permit optimum energy collection.

2. The solar energy collector system as defined in claim 1 wherein said multipartite heat collector means comprises a plurality of aligned heat collector plates thermally insulated from each other.

3. The solar energy collector system as defined in claim 2 wherein said fluid conduit means comprises at least one conduit in thermal contact substantially along the length of each of said collector plates.

4. The solar energy collector system as defined in claim 3 wherein said fluid conduit means of said plurality of heat collector plates are interconnected in a manner so as to conduct the heat transfer fluid from said source of supply therethrough to said exit means in a proper sequential order to permit optimization of the energy collection process.

5. The solar energy collector system as defined in claim 4 including a plurality of conduits in thermal contact with each of said collector plates.

6. The solar energy collector system as defined in claim 3 wherein said heat collector means is provided with an exterior black coating.

7. The solar energy collector system as defined in claim 1 wherein said multipartite heat collector means comprises a pair of laminar heat collector plates, separated by thermal insulation.

8. The solar energy collector system as defined in claim 7 wherein said fluid conduit means comprises at least one conduit, fixed in intimate contact substantially along the length of each of said heat collector plates.

9. The solar energy collector system as defined in claim 1 including a transparent cover plate, fixed in a closing relation along the length of the open upper end of said heat concentrating means.

10. The solar energy collector system as defined in claim 7 wherein said conduit means comprises at least one channel defined in each of said laminar heat collector plates between it and said thermal insulation.

11. The solar energy collector system as defined in claim 7 including a plurality of said laminar heat collector plates and thermal insulation, disposed in a generally bisecting relation to the cross sectional area within said heat concentrating means and extending substantially the length thereof.

12. The solar energy collector system as defined in claim 11 including a tubular, transparent convection shield disposed about each of said pluralities.

13. The solar energy collector system as defined in claim 12 wherein said tubular shield is evacuated and sealed at its respective ends.

14. The solar energy collector system as defined in claim 8 including a plurality of said laminar heat collection plates and thermal insulation plates in a generally bisecting relation to the cross sectional area within said heat concentrating means and extending substantially the length thereof, and a tubular, evacuated, sealed convection shield disposed about each of said pluralities.

* * * * *